(12) United States Patent
Crawford

(10) Patent No.: US 11,017,768 B2
(45) Date of Patent: May 25, 2021

(54) SYSTEMS AND METHODS FOR DISPENSING CONSUMABLE PRODUCTS WITH VOICE INTERFACE

(71) Applicant: PepsiCo, Inc., Purchase, NY (US)

(72) Inventor: Robert Crawford, Yorktown Heights, NY (US)

(73) Assignee: PepsiCo, Inc., Purchase, NY (US)

( * ) Notice: Subject to any disclaimer, the term of this patent is extended or adjusted under 35 U.S.C. 154(b) by 60 days.

(21) Appl. No.: 15/963,862

(22) Filed: Apr. 26, 2018

(65) Prior Publication Data

US 2019/0333502 A1     Oct. 31, 2019

(51) Int. Cl.

| | |
|---|---|
| *G10L 15/22* | (2006.01) |
| *G10L 17/22* | (2013.01) |
| *G10L 17/06* | (2013.01) |
| *G10L 15/30* | (2013.01) |
| *G06F 3/16* | (2006.01) |
| *G06F 3/0481* | (2013.01) |
| *G06F 16/635* | (2019.01) |
| *G10L 17/00* | (2013.01) |

(52) U.S. Cl.
CPC ............ *G10L 15/22* (2013.01); *G06F 3/0481* (2013.01); *G06F 3/167* (2013.01); *G06F 16/635* (2019.01); *G10L 15/30* (2013.01); *G10L 17/00* (2013.01); *G10L 17/06* (2013.01); *G10L 17/22* (2013.01); *G10L 2015/223* (2013.01)

(58) Field of Classification Search
CPC ......... G10L 15/00; G10L 15/07; G10L 15/18; G10L 15/183; G10L 15/22; G10L 15/26; G10L 15/28; G10L 15/30; G10L 2015/00; G10L 2015/06; G10L 2015/0638; G10L 2015/08; G10L 2015/081; G10L 2015/22; G10L 2015/223; G10L 2015/226
USPC .... 704/232, 235, 251, 257, 270, 170.1, 275, 704/270.1
See application file for complete search history.

(56) References Cited

U.S. PATENT DOCUMENTS

| | | | |
|---|---|---|---|
| 6,711,465 B2 | 3/2004 | Tomassi | |
| 8,744,618 B2 | 6/2014 | Peters et al. | |
| 9,776,848 B2 | 10/2017 | Metropulos et al. | |
| 10,602,334 B2 | 3/2020 | Kim | |
| 2002/0087413 A1* | 7/2002 | Mahaffy | G06Q 20/20 705/16 |
| 2007/0271194 A1* | 11/2007 | Walker | G06Q 30/02 705/80 |
| 2010/0125362 A1 | 5/2010 | Canora et al. | |
| 2016/0090288 A1 | 3/2016 | Givens, Jr. et al. | |
| 2016/0155285 A9 | 6/2016 | Peters et al. | |
| 2017/0113913 A1* | 4/2017 | DiFatta | B67D 1/0004 |
| 2017/0313568 A1* | 11/2017 | Kelly | B67D 1/0079 |

* cited by examiner

*Primary Examiner* — Qi Han
(74) *Attorney, Agent, or Firm* — Sterne, Kessler, Goldstein & Fox P.L.L.C.

(57) ABSTRACT

A method of dispensing a beverage from a beverage dispenser includes: detecting a user in proximity to the beverage dispenser; prompting the user to provide a first input, wherein the first input is audible; retrieving a user profile for the user based on the first input; receiving a second input from the user, wherein the second input comprises information about a beverage selection of the user, and wherein the second input is provided in a different manner than the first input; and dispensing the beverage.

20 Claims, 9 Drawing Sheets

SYSTEMS AND METHODS FOR DISPENSING CONSUMABLE PRODUCTS WITH VOICE INTERFACE

BACKGROUND

Field

Embodiments of the present disclosure relate generally to systems and methods of dispensing consumable products. More specifically, embodiments of the present disclosure relate to systems and methods using a voice interface for controlling a vending apparatus such as a beverage dispenser.

BACKGROUND

Beverage dispensers are used to dispense beverages to customers at various locations, such as restaurants, cafeterias, theatres and other entertainment and/or food service venues. In some locations, self-service beverage dispensers are employed to dispense beverages.

Authorization of the persons dispensing beverage(s) and the manner in which such persons are authorized to dispense may help a venue owner and/or operator reduce losses due to theft or wasteful consumption by customers. Also, positive customer experience with a self-service beverage dispenser may be desirable to a venue owner and/or operator. Positive customer experience and customer satisfaction associated with the use of a beverage dispenser may be a desirable tool for a venue owner/operator to entice beverage sales and return customers. Moreover, positive customer experience and satisfaction may facilitate brand recognition and may be a valuable marketing tool.

Therefore, a continuing need exists for methods and systems for allowing self-service beverage dispensing, for actuating self-service beverage dispensers, and for controlling access to self-service beverage dispensers.

BRIEF SUMMARY OF THE INVENTION

A method of dispensing a beverage from a beverage dispenser includes: detecting a user in proximity to the beverage dispenser; prompting the user to provide a first input, wherein the first input is audible; retrieving a user profile for the user based on the first input; receiving a second input from the user, wherein the second input comprises information about a beverage selection of the user, and wherein the second input is provided in a different manner than the first input; and dispensing the beverage.

A method of dispensing a beverage from a beverage dispenser includes: prompting a user to provide a voice input; utilizing the voice input to retrieve a user profile from a server comprising a database of stored user information including a plurality of voice profiles; and displaying a selection menu on a display based on the user profile.

A beverage dispenser includes: a display coupled to the beverage dispenser; a first control interface coupled to the beverage dispenser, wherein the first control interface is configured to receive a first input comprising a voice input from a user; and a second control interface coupled to the beverage dispenser, wherein the second control interface is configured to receive a second input from the user, wherein the second input is an input different from a voice input. In one embodiment, the beverage dispenser comprises a nozzle for dispensing a carbonated or still drink, water, juice or other beverage. In one embodiment, the beverage dispenser comprises a vending machine for vending a beverage.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

User interaction with a vending apparatus, such as, for example, a beverage dispenser is typically limited. Such machines often have limited user interfaces that function only to receive payment, acknowledge a user's product selection, and dispense that product. These vending machines do not actually interact with the user, though, and only accomplish the primary goal of purchase and sale, but do not allow the user to customize the product he wishes to buy and do not have access to any user information that might facilitate selection of a certain product. Furthermore, conventional vending machines require payment by cash, card, or through some other digital means of payment, for example. Consequently, if a user happens to be without his wallet or phone, he cannot make a purchase from the machine. Accordingly, embodiments of a vending apparatus having a voice control interface are described herein. Certain embodiments of the described vending apparatus enable one-way or two-way voice communication between the vending apparatus and a user to allow for facilitated selection of a product and ease of payment.

Embodiments described herein provide a vending apparatus 100 that is operable based on a user input that comprises a voice input, such as a voice command. In one embodiment, the vending apparatus 100 comprises a beverage dispenser. The beverage dispenser may be configured to dispense a beverage, such as, for example, a carbonated beverage. In other embodiments, the vending apparatus 100 may comprise a vending machine, a cooler, or other similar apparatus.

Figure 1:
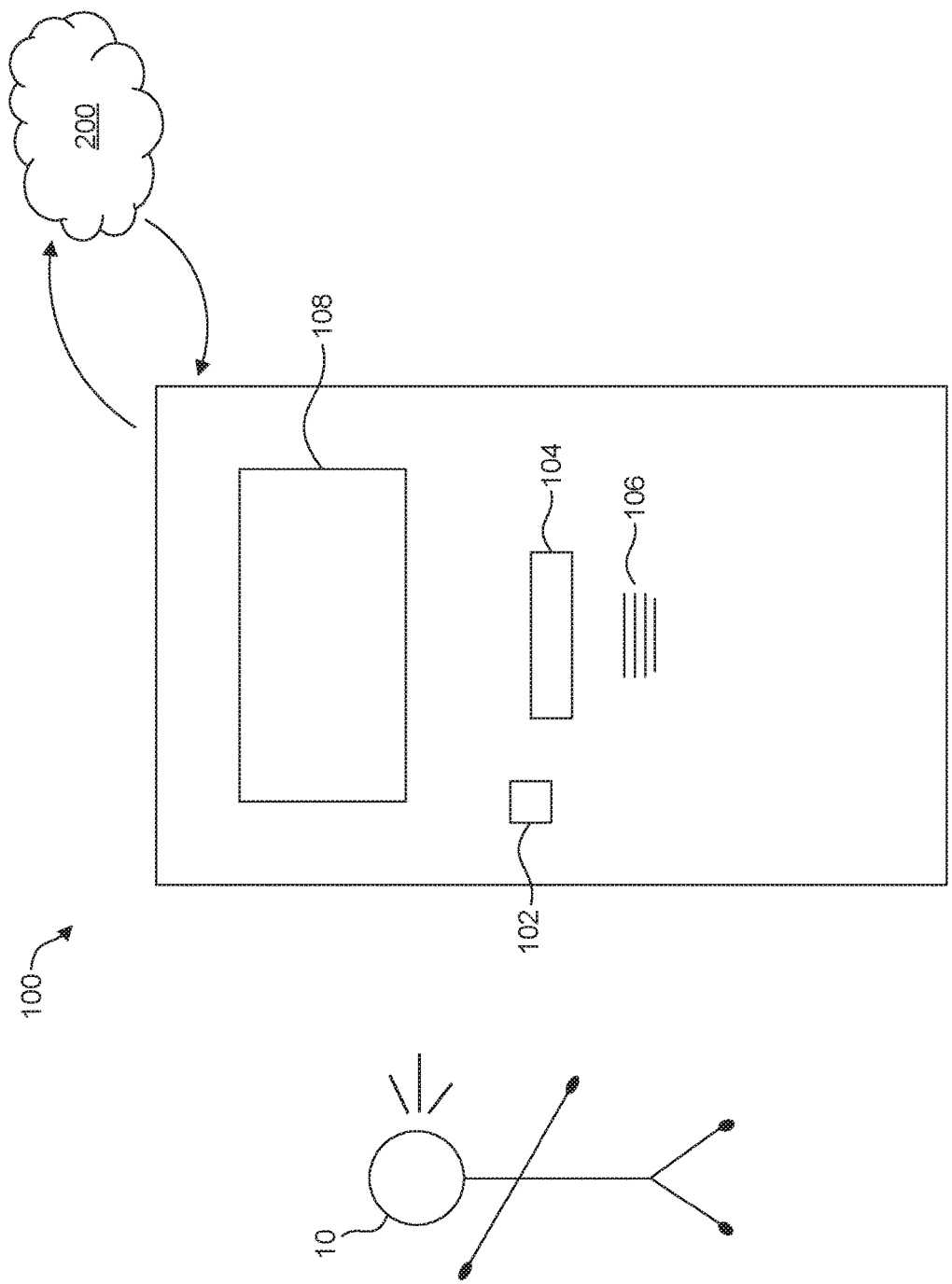
FIG. 1 is a schematic depiction of a user communicating with a vending apparatus, and of the vending apparatus communicating with a remote server, according to embodiments.
Figure 2:
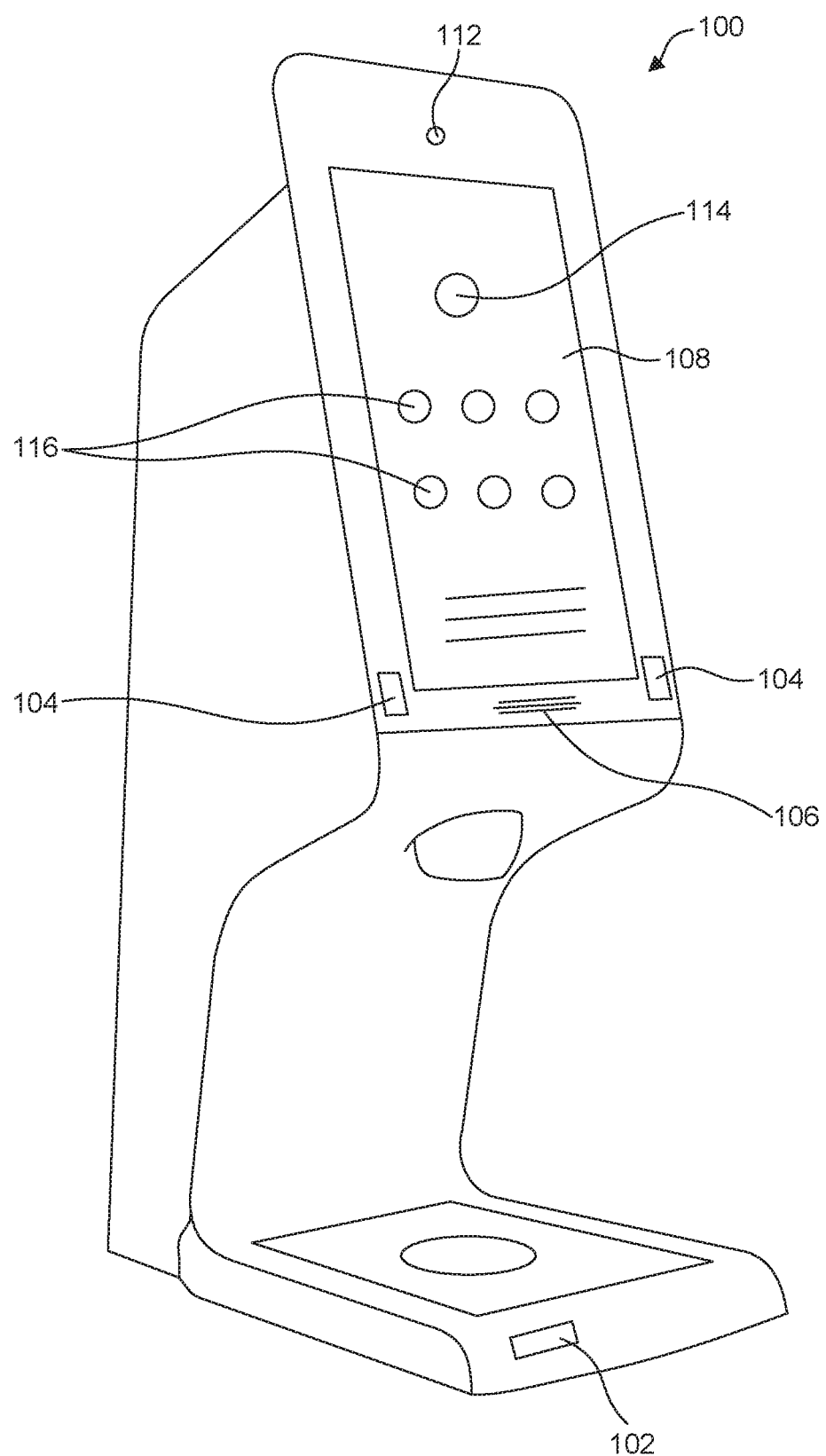
FIG. 2 is a front perspective view of a beverage dispenser vending apparatus, according to embodiments.

With reference to FIGS. 1 and 2, vending apparatus 100 includes a display 108 for displaying information to a user 10. In some embodiments, as discussed below, the display 108 may comprise a graphical user interface and may comprise a control interface for receiving input from the user. The vending apparatus 100 includes a control interface 106 configured to receive user input from the user. In some embodiments, control interface 106 comprises a microphone configured to receive user input from the user comprising an audible input. In one embodiment, the user input may comprise a voice input including a voice command. In some embodiments, vending apparatus 100 may further include a speaker 104 for providing audible information to user 10. The audible information may comprise instructions, feedback, or other information to user 10. In some embodiments, vending apparatus 100 includes a sensor 102 for determining the proximity of a user relative to the vending apparatus 100.

During operation, when user 10 wants to dispense a product, he may approach vending apparatus 100. When user 10 is within a certain range of vending apparatus 100, his presence may be sensed by the sensor 102 coupled to the vending apparatus 100. The detectable range of the user may vary on the type of detection sensor used. In certain embodiments, sensor 102 may be any sensor including, but not limited to, an infrared sensor, a temperature sensor, a proximity sensor, a microwave sensor, an ultrasonic wave sensor, a video camera, an ultrasonic sensor, an RFID sensor, or any combination thereof.

Once sensor 102 detects the presence of user 10, vending apparatus 100 may output an audible greeting via speaker 104 to engage user 10. The greeting may be a short "hello" phrase such as, for example, "Would you like a Pepsi?," or any other phrase that may cause the user to approach vending apparatus 100. The user 10 may then either respond vocally to vending apparatus 100 or engage vending apparatus 100 by tactilely interacting with display 108, which may, in certain embodiments, include a touch screen. Vending apparatus 100 may receive the vocal response of user 10 through control interface 106, which may be a microphone. Upon user engagement, vending apparatus 100 may prompt user 10 to provide a voice input. In some embodiments, the prompt given by vending apparatus 100 may be audible via speaker 104, for example. In other embodiments, the prompt given by vending apparatus 100 may be visual via display 108, for example. The voice input may be a recitation of the user's name, for example, or a recitation of another short phrase. Vending apparatus 100 may receive the user's voice input via control interface 106.

In some embodiments, vending apparatus 100 may prompt a user to enter a non-voice input, such as, for example, a tactile input via a touch screen or a text input. A text input may contain, for example, information relating to the users for identity, such as, for example, the user's name.

In some embodiments, a processor (not shown) may transmit the user's voice or non-voice input to a remote server 200, which may include a database of stored user information. User information stored on remote server may include, but is not limited to, user profiles created by users, which may include data such as, for example, user voice profiles, names, profile photos, product preferences, purchase history, language settings, accessibility settings, and payment methods and information. Remote server 200 may utilize the user's voice or non-voice input to retrieve his corresponding user profile, which it may then communicate to vending apparatus 100.

A user may create and/or modify a user profile through various means such as, but not limited to, a mobile application, a computer application, or through a vending apparatus such as vending apparatus 100. Accordingly, in some embodiments, vending apparatus may include a control interface 106 to record a voice profile for user 10, and, in some embodiments, vending apparatus 100 may include a camera 112 which may be used, for example, to capture a user profile photo during creation of a user profile.

Figure 5:
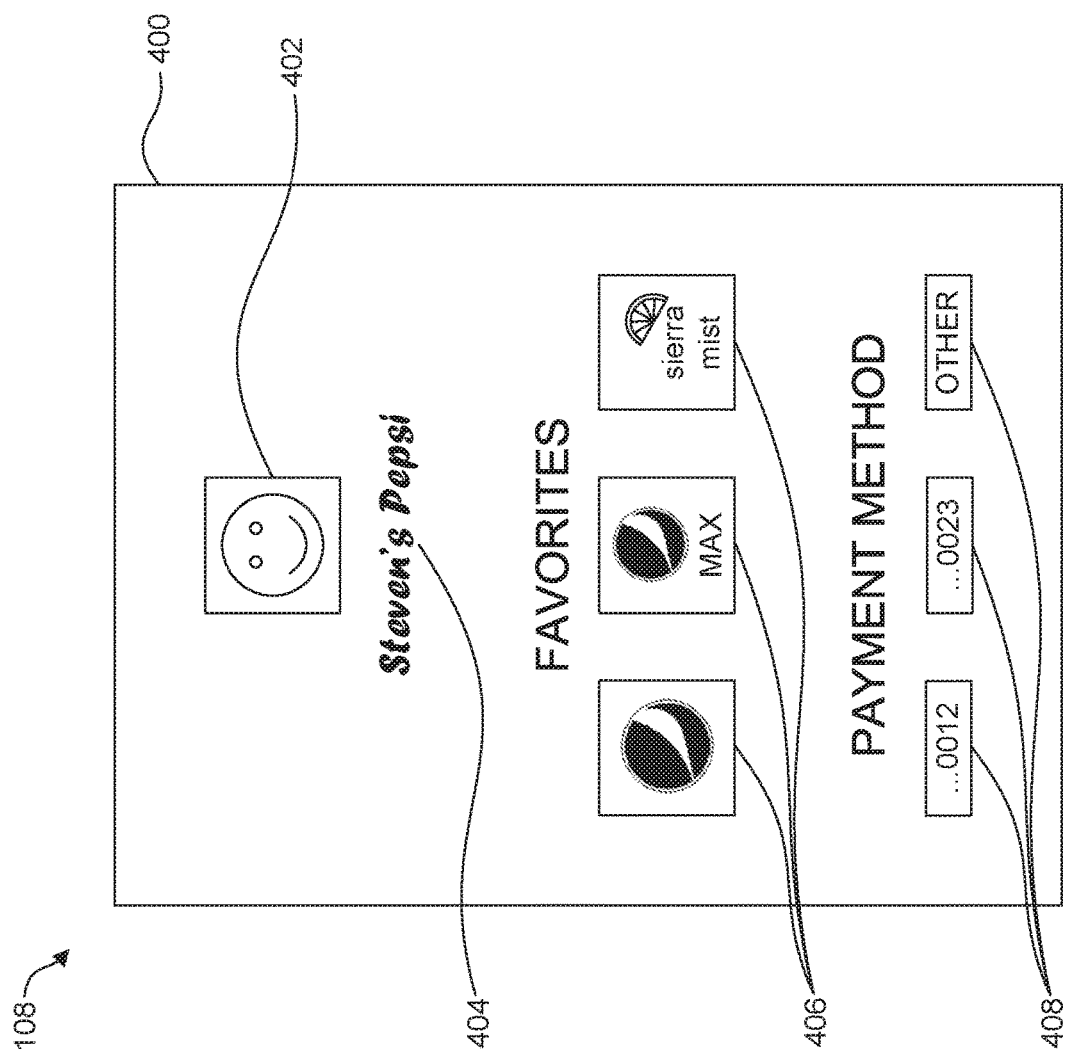
FIG. 5 shows a graphical user interface for a vending apparatus such as a beverage dispenser, according to some embodiments.

Upon receipt of the user profile, vending apparatus 100 may present a graphical user interface (GUI), as shown, for example, in FIG. 5, on display 108. The GUI may be customized with product selection options based on the user's profile retrieved by remote server 200. Accordingly, display 108 may include a user profile screen 400, which may include, but is not limited to, a profile photo 402 of the user, the user's name 404, "favorite" product selection options 406, and payment methods 408. Favorite product selection options 406 may be designated by user 10 or may be generated by vending apparatus 100 based on products frequently selected by user 10 or on other data, such as, for example, additional user input.

In some embodiments, user 10 may select a product for purchase by communicating his selection vocally to vending apparatus 100. In other embodiments, user 10 may select a product for purchase by communicating his selection to vending apparatus 100 through tactile interaction with display 108.

In some embodiments, user 10 may select a product for purchase by audibly expressing his selection in a single statement. For example, user 10 may state, "I would like a large Pepsi Max with lemon flavor and light ice." As another example, user 10 may state, "I would like favorite option 1," or simply, "Favorite 1."

Figure 6A:
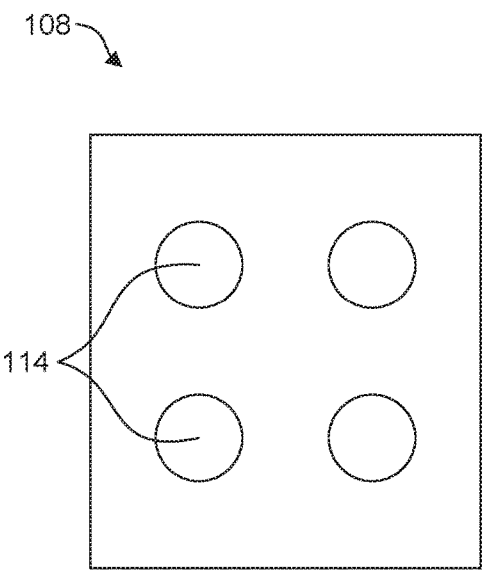
FIG. 6A shows a first display of a graphical user interface for a vending apparatus such as a beverage dispenser, according to some embodiments.
Figure 6B:
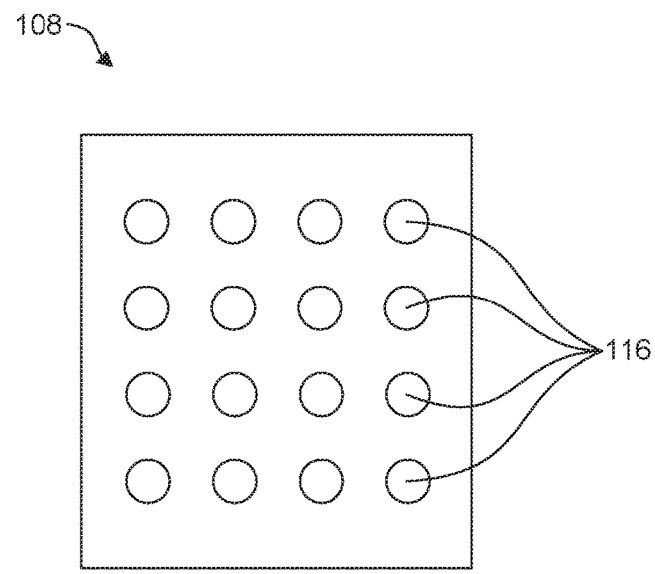
FIG. 6B shows a second display of a graphical user interface for a vending apparatus such as a beverage dispenser, according to some embodiments of a vending apparatus.

In some embodiments, vending apparatus 100 is an interactive beverage dispenser, such as, for example, a Pepsi Spire® beverage dispenser, as shown in FIG. 2. In such embodiments, the GUI may guide user 10 to make stepwise selections, as shown in FIGS. 6A-6D. For example, as shown in FIG. 6A, the GUI may display a first set of icons 114, which may represent, for example, different types of beverages. The types of beverages may include, but are not limited to cola, diet cola, lemon-lime soda, root beer, iced tea, water, etc. User 10 may then either vocally state his selection or make his selection through tactilely interacting with display 108. Once user 10 selects a type of beverage, the GUI may display a second set of icons 116, as shown, for example, in FIG. 6B. The second set of icons may represent, for example, different flavor or sweetener add-in options. Flavor options may include, but are not limited to unsweetened liquid flavoring, sweetened flavor syrups, and powdered flavoring. Sweetener options may include, but are not limited to sugar, simple syrup, liquid artificial sweetener, and granulated artificial sweetener. User 10 may also choose not to add any flavoring. As with selection of the type of beverage, the user may select flavoring or sweetener either vocally or through tactile interaction with display 108.

Figure 6C:
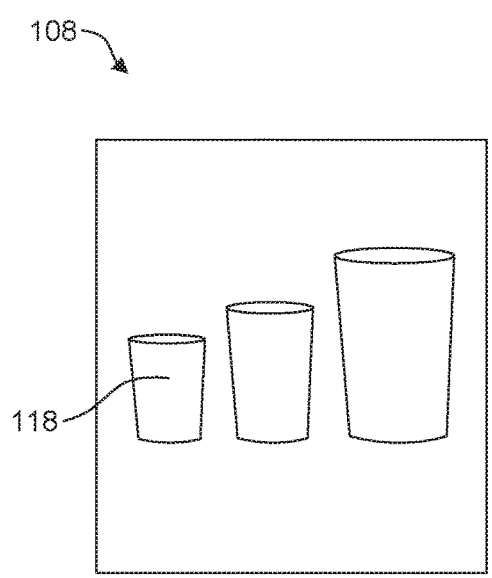
FIG. 6C shows a third display of a graphical user interface for a vending apparatus such as a beverage dispenser, according to some embodiments of a vending apparatus.
Figure 6D:
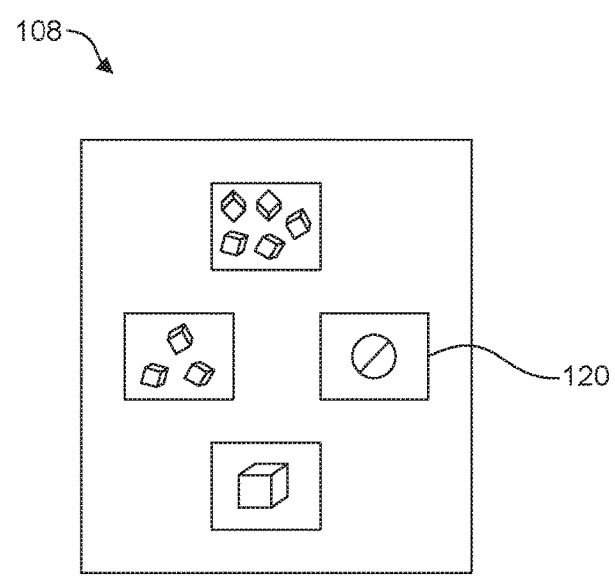
FIG. 6D shows a fourth display of a graphical user interface for a vending apparatus such as a beverage dispenser, according to some embodiments of a vending apparatus.

After flavor selection is complete, the GUI may display a third set of icons 118, as shown, for example, in FIG. 6C. Third set of icons 118 may represent, for example, different beverage sizes available for selection. The GUI may also display another screen with a fourth set of icons 120, as shown, for example, in FIG. 6D, which may, for example, represent different amounts of ice that may be added to the beverage. As with the previous selection screens, the user may select his desired beverage size and ice amount either vocally or through tactile interaction with display 108. Once all selections have been made, vending apparatus 100 may dispense the user's customized beverage.

In some embodiments, vending apparatus 100 may output an audible "goodbye" statement once the product has been dispensed. In other embodiments, vending apparatus 100 may ask the user if he would like to make an additional product selection after the first product has been dispensed.

If a user has not yet created a user profile, vending apparatus 100 may prompt the user to input information, either vocally or non-vocally, that may assist vending apparatus 100 in generating a product suggestion. Such information may include, but is not limited to, the user's mood, age, or dietary restrictions, the weather, the geographic location, and what other food or beverages the user will be concurrently consuming. Vending apparatus 100 may communicate the user's input with remote server 200, which may compare the user's input to information stored in user profiles for similar users in order to generate a product suggestion. Similarly, if vending apparatus 100 happens to be sold out of a particular product, it may connect to remote server to retrieve information from the database of user profiles, which may, for example, include the alternate product preferences of those users who had selected the sold out product as one of their "favorites" in their user profiles. This information may be used to generate a product suggestion to replace the sold out product.

Figure 3:
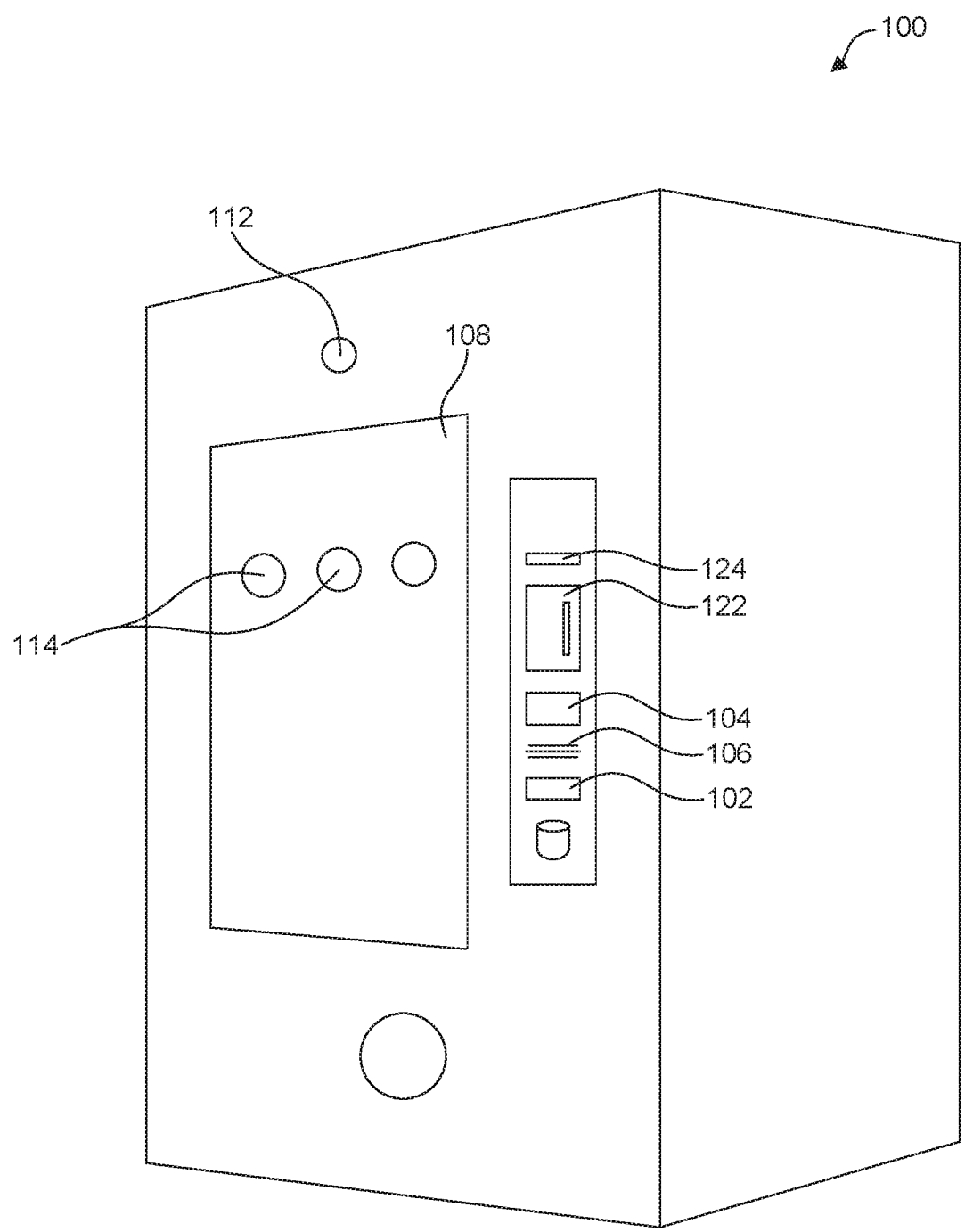
FIG. 3 is a front perspective view of a vending apparatus, according to embodiments.

In some embodiments, vending apparatus 100 may be a vending machine, as shown in FIG. 3, which may dispense pre-packaged products, such as, for example, beverages packaged in plastic bottles or cans. In such embodiments, when vending apparatus 100 retrieves the user's profile, user 10 may go through the same selection steps as described above. Where the vending apparatus 100 is a standalone vending machine that may be installed in a public place outside of a restaurant setting, such as, for example, in a mall, airport, sports venue, etc., it may incorporate several payment intake options. For example, as shown in FIG. 5, the user profile may include stored payment methods 408. Accordingly, user 10 may choose to pay using a credit card or bank account he has stored in his user profile. Payment methods 408 may be selected vocally by stating, for example "Card 1," or through tactile interaction with display 108. Vending apparatus 100 may alternatively, or additionally, include a credit card reader 122, a cash acceptor 124, and/or a RFID sensor or QR code reader, for example, which may be configured to facilitate payment via a cellular device.

Figure 4:
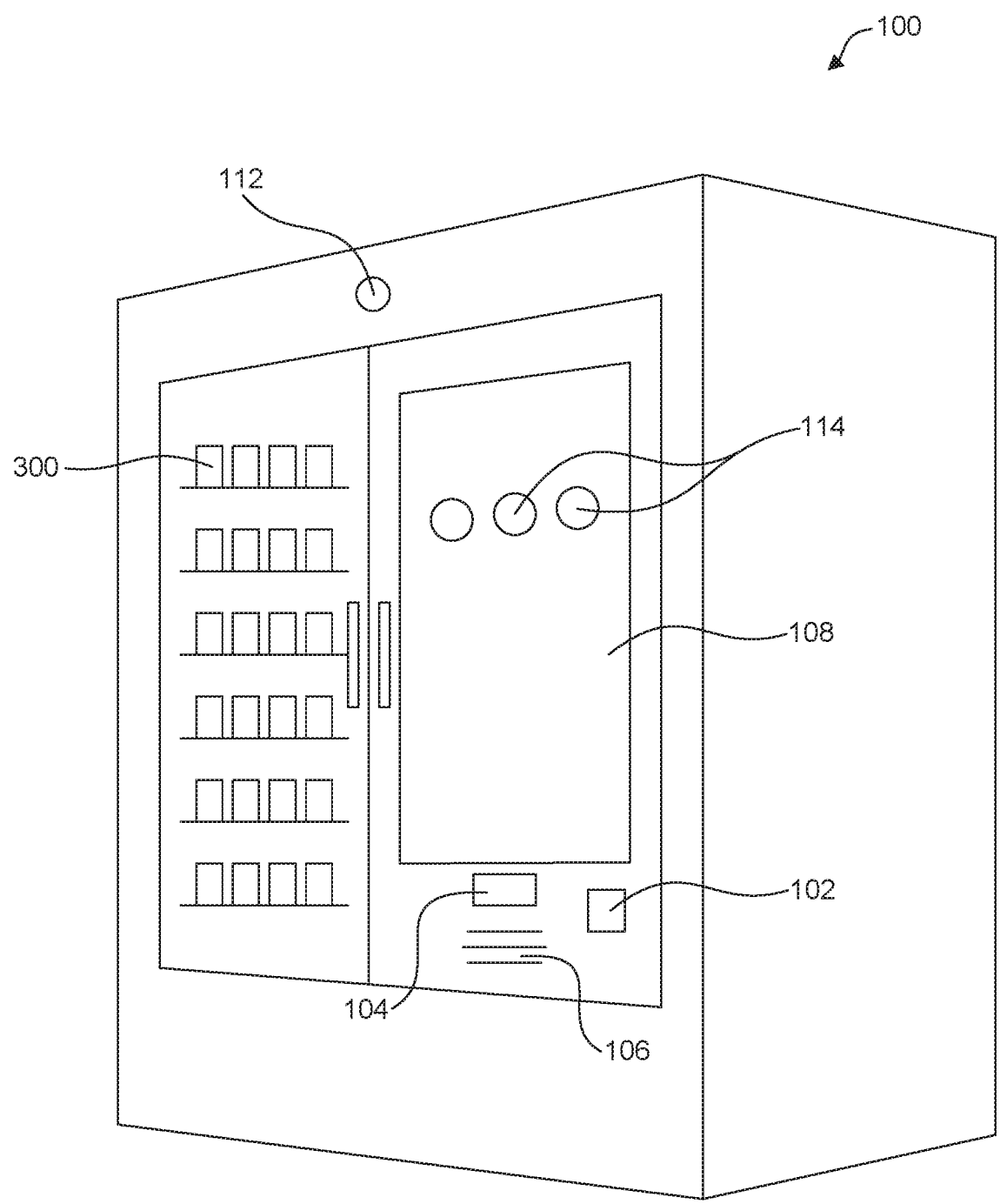
FIG. 4 is a front perspective view of a vending apparatus, according to embodiments.

In other embodiments, vending apparatus 100 may be a cooler, as shown in FIG. 4. In such embodiments, when vending apparatus 100 retrieves the user's profile, user 10 may go through the same selection steps as described above. In some embodiments, when user 10 selects a desired refrigerated product 300, that product may be illuminated to allow for quick retrieval.

In some embodiments, vending apparatus 100 may be configured to communicate with a user in any language preferred by the user. The user may set his language preference in his user profile, for example, by vocally stating his preferred language, or by tactilely selecting his preferred language on display 108.

In some embodiments, a mobile application may facilitate user creation of a voice profile to be stored in database on remote server 200. The mobile application may record the voice profile and upload the voice profile to the user profile on remote server 200.

In some embodiments, user voice input may include a voice prompt to facilitate interaction with vending apparatus 100. For example, user voice input may include a voice prompt, such as, for example, "Dispenser!" before any further input is provided. In some embodiments, the voice prompt may turn on or wakeup vending apparatus 100 or a portion of vending apparatus 100 (e.g., display 108) in order to engage the user.

Figure 7:
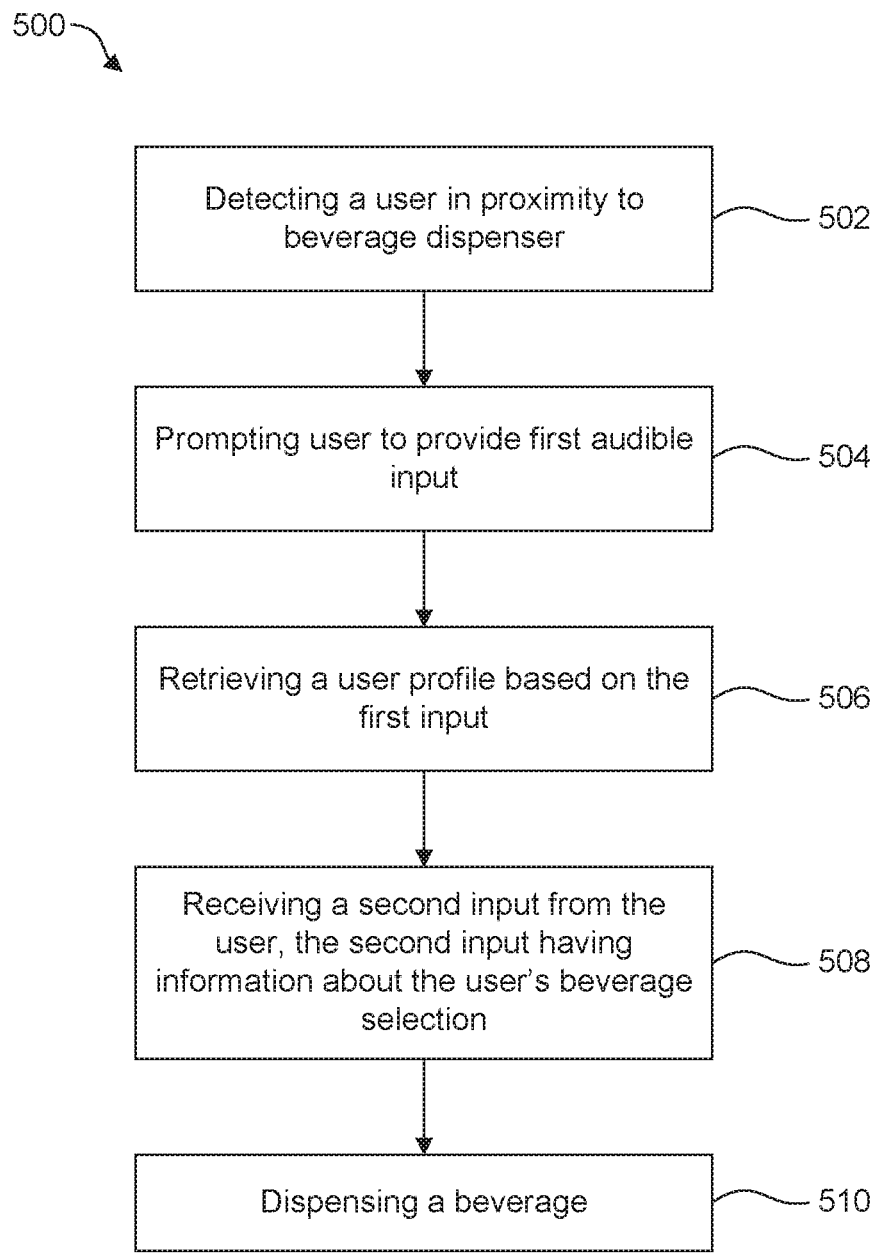
FIG. 7 shows a functional diagram of a vending apparatus according to some embodiments.

FIG. 7 shows a functional diagram of a vending machine apparatus according to some embodiments. According to some embodiments, a method of dispensing a beverage from a beverage dispenser 500 may include multiple steps. The method may include detecting a user in proximity to the beverage dispenser 502. Once a user is detected, the vending machine may prompt the user to provide a first audible input 504. The vending machine may retrieve a user profile based on the first input 506. The vending machine may then receive a second input from the user 508. In some embodiments, the second input from the user may include information about the user's beverage selection 508. After the second input is received, the vending machine dispenses the beverage 510.

Figure 8:
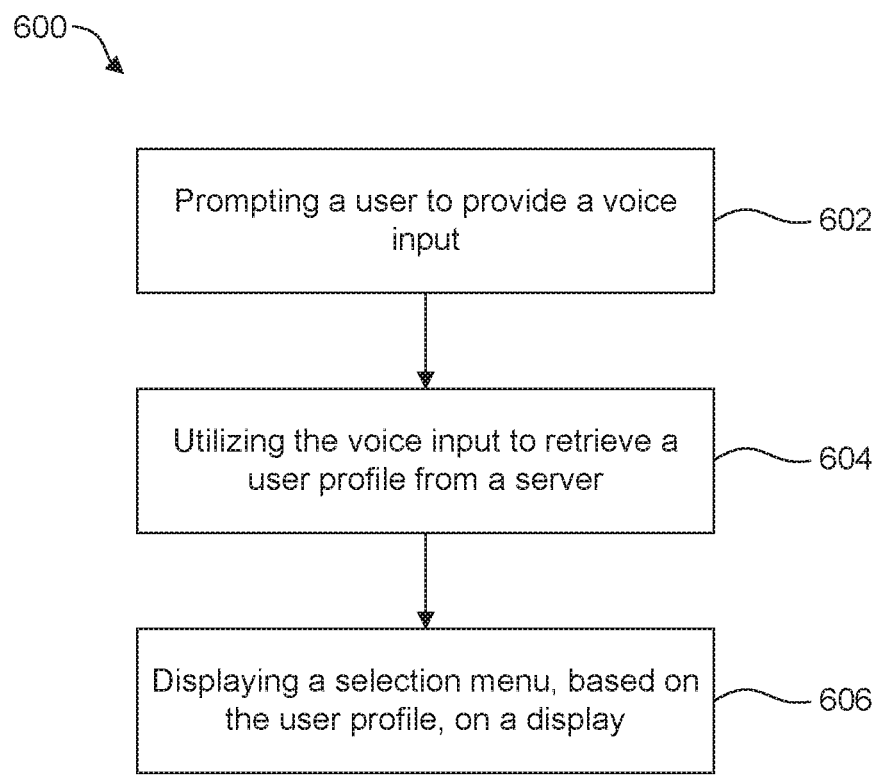
FIG. 8 shows a functional diagram of a vending apparatus according to some embodiments.

FIG. 8 shows a functional diagram of a vending machine apparatus according to some embodiments. According to some embodiments, the vending machine may prompt the user to provide a voice input 602. The vending machine may utilize the voice input to retrieve a user profile from a server 604. The vending machine may then display a selection menu based on the user profile 606.

Figure 9:
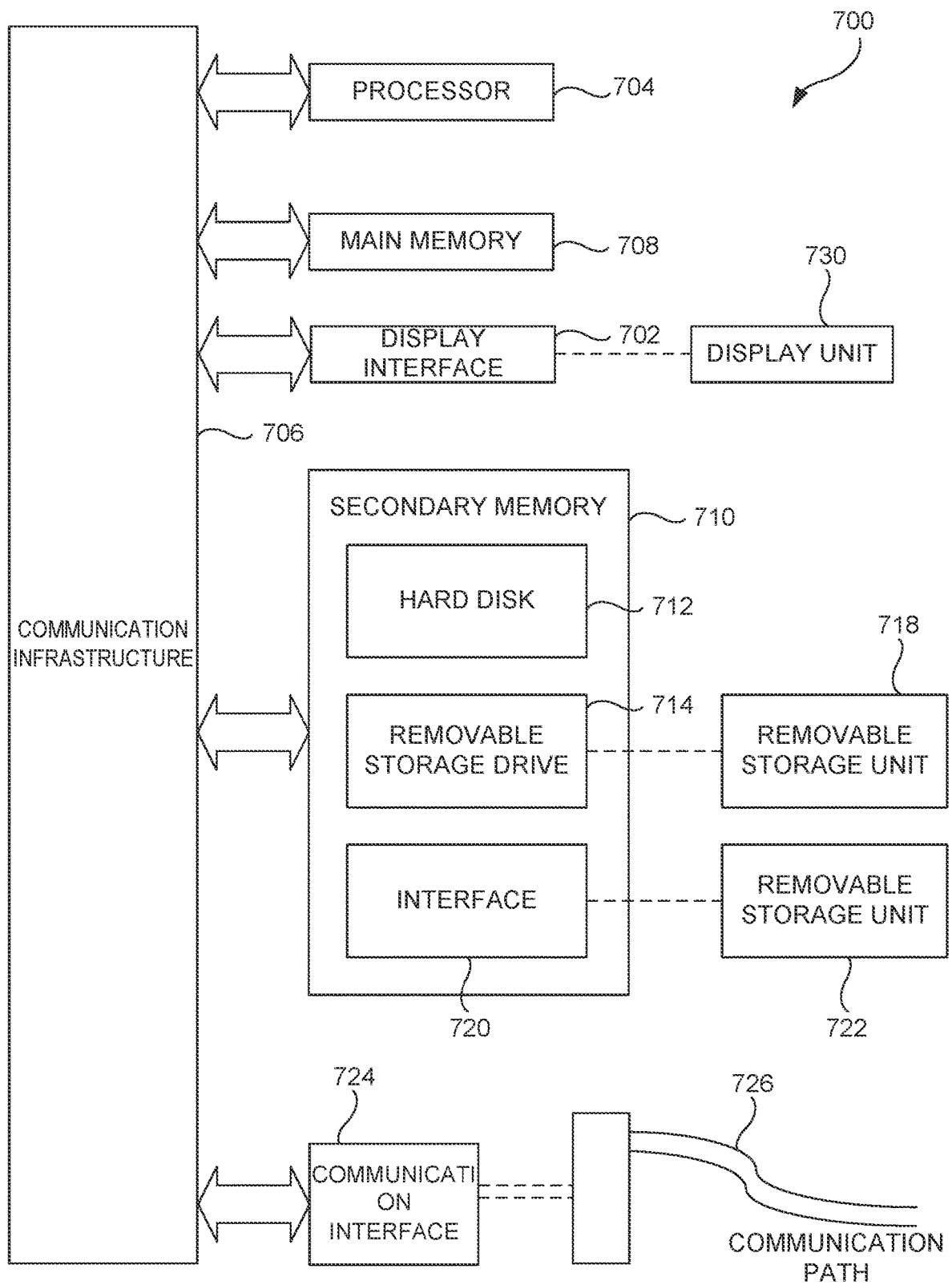
FIG. 9 is a schematic block diagram of an exemplary computer system in which embodiments may be implemented.

FIG. 9 illustrates an exemplary computer system 700 in which embodiments, or portions thereof, may be implemented as computer-readable code. For example, detecting a user in proximity to the beverage dispenser, operation of the control interfaces, retrieval of a user profile, authentication of customer accounts, and/or other operations of vending apparatus 100 discussed herein may be implemented in computer system 700 using hardware, software, firmware, tangible computer readable media having instructions stored thereon, or a combination thereof and may be implemented in one or more computer systems or other processing systems. Controllers discussed herein may be computer systems having all or some of the components of computer system 700 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores." For example, at least one processor device and a memory may be disposed in vending apparatus 100 or remote from vending apparatus 100.

Various embodiments of the invention(s) may be implemented in terms of this example computer system 700. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, or removable storage drive 714. Removable storage drive 714 may include a floppy disk drive, a magnetic tape drive, an optical disk drive, a flash memory, or the like. The removable storage drive 714 reads from and/or writes to a removable storage unit 718 in a well-known manner. Removable storage unit 718 may include a floppy disk, magnetic tape, optical disk, a universal serial bus (USB) drive, etc. which is read by and written to by removable storage drive 714. As will be appreciated by persons skilled in the relevant art, removable storage unit 718 includes a computer usable storage medium having stored therein computer software and/or data.

Computer system 700 (optionally) includes a display interface 702 (which can include input and output devices such as keyboards, mice, etc.) that forwards graphics, text, and other data from communication infrastructure 706 (or from a frame buffer not shown) for display on display unit 730.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communication interface 724. Communication interface 724 allows software and data to be transferred between computer system 700 and external devices. Communication interface 724 may include a modem, a network interface (such as an Ethernet card), a communication port, a PCMCIA slot and card, or the like. Software and data transferred via communication interface 724 may be in the form of signals, which may be electronic, electromagnetic, optical, or other signals capable of being received by communication interface 724. These signals may be provided to communication interface 724 via a communication path 726. Communication path 726 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communication interface 724. Such computer programs, when executed, enable computer system 700 to implement the embodiments as discussed herein. In particular, the computer programs, when executed, enable processor device 704 to implement the processes of the embodiments discussed here. Accordingly, such computer programs represent controllers of the computer system 700. Where the embodiments are implemented using software, the software may be stored in a computer program product and loaded into computer system 700 using removable storage drive 714, interface 720, and hard disk drive 712, or communication interface 724.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A method of dispensing a beverage from a beverage dispenser, the method comprising:
    detecting a user in proximity to the beverage dispenser;
    prompting the user to provide a first input, wherein the first input is audible;
    retrieving a user profile for the user based on the first input from a remote server;
    generating a custom graphical user interface based on the user profile received from the remote server;
    receiving a second input from the user, wherein the second input comprises information about a beverage selection of the user, and wherein the second input is provided in a different manner than the first input; and
    dispensing the beverage,
    wherein the user's proximity is detected using a motion detector.

2. The method of claim 1, wherein the first input comprises a voice command.

3. The method of claim 1, wherein the user profile is retrieved from a server comprising a database of stored user information, where in the stored user information comprises a plurality of voice profiles.

4. The method of claim 3, wherein retrieving the user profile comprises:
    communicating the first input to the server;
    comparing the first input to the plurality of voice profiles stored within the database; matching the first input to the voice profile created by the user; and
    identifying the user profile for the user.

5. The method of claim 1, wherein the user profile comprises a voice profile created by the user.

6. The method of claim 1, wherein the information about the beverage selection of the user comprises at least one selected from the group consisting of: a type of a beverage, a flavoring, and a cup size.

7. The method of claim 1, further comprising providing a suggested beverage selection based on the first input.

8. The method of claim 1, further comprising, providing a suggested beverage selection based on the first input, wherein the suggested beverage selection is based on weather.

9. The method of claim 1, wherein a mobile application facilities user creation of a voice profile of the user profile.

10. A method of dispensing a beverage from a beverage dispenser, the method comprising:
    prompting a user to provide a voice input;
    comparing, at a remote server, the voice input to a database of user information stored at the remote server, the database including a plurality of voice profiles; and
    displaying a selection menu on a display based on the user profile,
    receiving, from the customer, a customer selection from the selection menu,
    displaying a second selection menu,
    wherein the customer selection is received by a microphone on the beverage dispenser.

11. The method of claim 10, wherein the user profile comprises a beverage selections preferred by the user and wherein a selection menu includes a plurality of icons, the icons representing the beverage selections preferred by the user.

12. The method of claim 10, wherein the user profile comprises a beverage selections preferred by the user personal identifying information relating to the user selected from the group consisting of: name, age, language preference, and payment information.

13. The method of claim 10, wherein prompting a user to provide a voice input comprises audibly prompting the user.

14. The method of claim 10, wherein utilizing the voice input to retrieve a user profile from a server comprises:
    comparing the voice input to the plurality of voice profiles;
    matching the voice input to a voice profile identified with the user; and
    retrieving a corresponding user profile.

15. A beverage dispenser, comprising:
    a display coupled to the beverage dispenser;
    a first control interface coupled to the beverage dispenser, wherein the first control interface is configured to receive a first input comprising a voice input from a user;
    a second control interface coupled to the beverage dispenser, wherein the second control interface is configured to receive a second input from the user, wherein the second input is an input different from a voice input; and
    a processor configured to retrieve stored user information from a server comprising a database of stored user information, wherein the retrieved stored user information is selected by comparing the voice input from the user to a plurality of stored voice profiles,
    wherein the stored user information includes a stored beverage preference, and
    wherein the display comprises a graphical user interface that updates based on the stored user information.

16. The beverage dispenser of claim 15, further comprising a nozzle for dispensing a carbonated beverage.

17. The beverage dispenser of claim 15, wherein the first control interface comprises a microphone and a processor.

18. The beverage dispenser of claim 15, wherein the display comprises a touch screen.

19. The beverage dispenser of claim 18, wherein the second control interface comprises the touch screen display.

20. The beverage dispenser of claim 18, wherein the second input comprises a tactile input to the touch screen display.

\* \* \* \* \*